(12) United States Patent
Ali et al.

(10) Patent No.: US 7,363,532 B2
(45) Date of Patent: Apr. 22, 2008

(54) SYSTEM AND METHOD FOR RECOVERING FROM A DRIVE FAILURE IN A STORAGE ARRAY

(75) Inventors: Ahmad A. J. Ali, Austin, TX (US); Rohit Chawla, Waco, TX (US); Gary B. Kotzur, Austin, TX (US); Kevin T. Marks, Round Rock, TX (US); Howard A. Shoobe, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 616 days.

(21) Appl. No.: 10/923,119

(22) Filed: Aug. 20, 2004

(65) Prior Publication Data
US 2006/0041782 A1 Feb. 23, 2006

(51) Int. Cl.
*G06F 11/00* (2006.01)
(52) U.S. Cl. .......................................... 714/6
(58) Field of Classification Search ............... 714/6–8, 714/13, 15, 42
See application file for complete search history.

(56) References Cited

U.S. PATENT DOCUMENTS

| | | | |
|---|---|---|---|
| 6,282,671 B1 * | 8/2001 | Islam et al. | 714/6 |
| 6,598,174 B1 * | 7/2003 | Parks et al. | 714/6 |
| 6,862,609 B2 * | 3/2005 | Merkey | 709/214 |
| 6,985,995 B2 * | 1/2006 | Holland et al. | 711/114 |
| 6,985,996 B1 * | 1/2006 | Nagshain | 711/114 |
| 7,093,182 B2 * | 8/2006 | Dickson | 714/770 |
| 7,127,557 B2 * | 10/2006 | Ito et al. | 711/114 |
| 7,133,965 B2 * | 11/2006 | Chien | 711/114 |
| 7,206,991 B2 * | 4/2007 | Chatterjee et al. | 714/770 |

* cited by examiner

*Primary Examiner*—Nadeem Iqbal
(74) *Attorney, Agent, or Firm*—Baker Botts L.L.P.

(57) ABSTRACT

A system and method for recovering from a drive failure in a storage array is disclosed in which a spare drive array is provided in the event of a failure in one of the active drives of the storage array. The spare drive array is comprised of multiple drives that are comprised in a RAID 0 configuration to reduce the time required to rebuild the content of the failed drive on the spare drive.

25 Claims, 3 Drawing Sheets

SYSTEM AND METHOD FOR RECOVERING FROM A DRIVE FAILURE IN A STORAGE ARRAY

TECHNICAL FIELD

The present disclosure relates generally to the field of computer networks, and, more particularly, to a system and method for recovering from a drive failure in a fault tolerant storage environment.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a storage system or storage network that includes fault tolerant data storage. One example of a fault tolerant data storage system is a RAID (Redundant Array of Independent Disks) storage system. RAID storage systems combine multiple disks into an array of disk drives to obtain performance, capacity, and reliability advantages over other storage techniques, including, for example, a single large drive. RAID Level 5 is an example of fault tolerant data storage system. A RAID Level 5 storage system is characterized by the striping of data across disks in the storage system. A set of parity bits generated by an exclusive-OR of the data bits is stored on a disk that is separate from the striped data. The parity bits for the respective stripes of data are distributed among the disks of the storage system so that each disk will likely contain both data bits for a stripe or data and parity bits related to some other stripe of data. In a RAID Level 5 storage system, it is typical that no single disk includes all of the parity bits. RAID Level 5 is often referred to as a rotating parity storage.

In a RAID Level 5 storage system, if one of the disks fails, the data on the disk can be rebuilt. The rebuild of the failed or degraded volume is accomplished by performing an exclusive-OR operation with the data on the other disks in the data stripe, including the parity bits associated with the data stripe. The rebuild of a degraded volume is often a tedious process, occurring one data row or data stripe at a time. Assuming a RAID Level 5 storage system having three disks, which is the minimum for a RAID Level 5 storage system, rebuilding a single stripe of data involves two reads—one read from each surviving disk—and write of data to the disk being rebuilt. For a Level 5 RAID array having N number of drives, the rebuild of a degraded volume will require N−1 reads and a write to the degraded volume for each stripe set. Assuming that a typical stripe of data is 64 KB in size, the rebuild of a degraded volume is a time-consuming process, especially for those Level 5 RAID arrays having multiple drives and a large volume of data storage per drive.

Fault tolerant storage systems may be vulnerable to a failure of a drive during the period that a failed drive or a spare drive is being rebuilt. During this period, the storage array may be described as being non-redundant, as the storage array cannot compensate for the failure of another disk in the storage array. The rebuild period for a single disk of a storage array may be lengthy. Because disk capacity has increased in relative terms as compared with the write throughput rate of data to disk media, the rebuild time required for a single failed disk has increased over time. The longer the rebuild period, the longer the storage array exists in a non-redundant state.

SUMMARY

In accordance with the present disclosure, a system and method for recovery from a drive failure in a storage array is disclosed in which a spare drive array is provided in the event of a failure in one of the active drives of the storage array. The spare drive array is comprised of multiple drives that are comprised in a RAID 0 configuration. The content of the entire failed drive is written across the multiple drives of the spare drive array. The system and method disclosed herein is advantageous because it reduces the period during which the storage array is in a non-redundant state following the failure of a drive of the storage array. Because the entire content of the storage array can be written to a substitute storage having multiple drives, the storage array can be returned more quickly to a fault tolerant state, as compared with the technique of rebuilding the content of the failed drive on a single replacement drive. Other technical advantages will be apparent to those of ordinary skill in the art in view of the following specification, claims, and drawings. The system and method disclosed herein is also advantageous because the serial mapping of recovered data from the failed drive is accomplished in a manner that improves access to the recovered data during the period that the drives of the spare storage comprise a portion of the active storage array. Following the replacement or repair of the failed drive, the same mapping methodology can be used to write the data of the spare storage array to the replaced or repaired drive.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
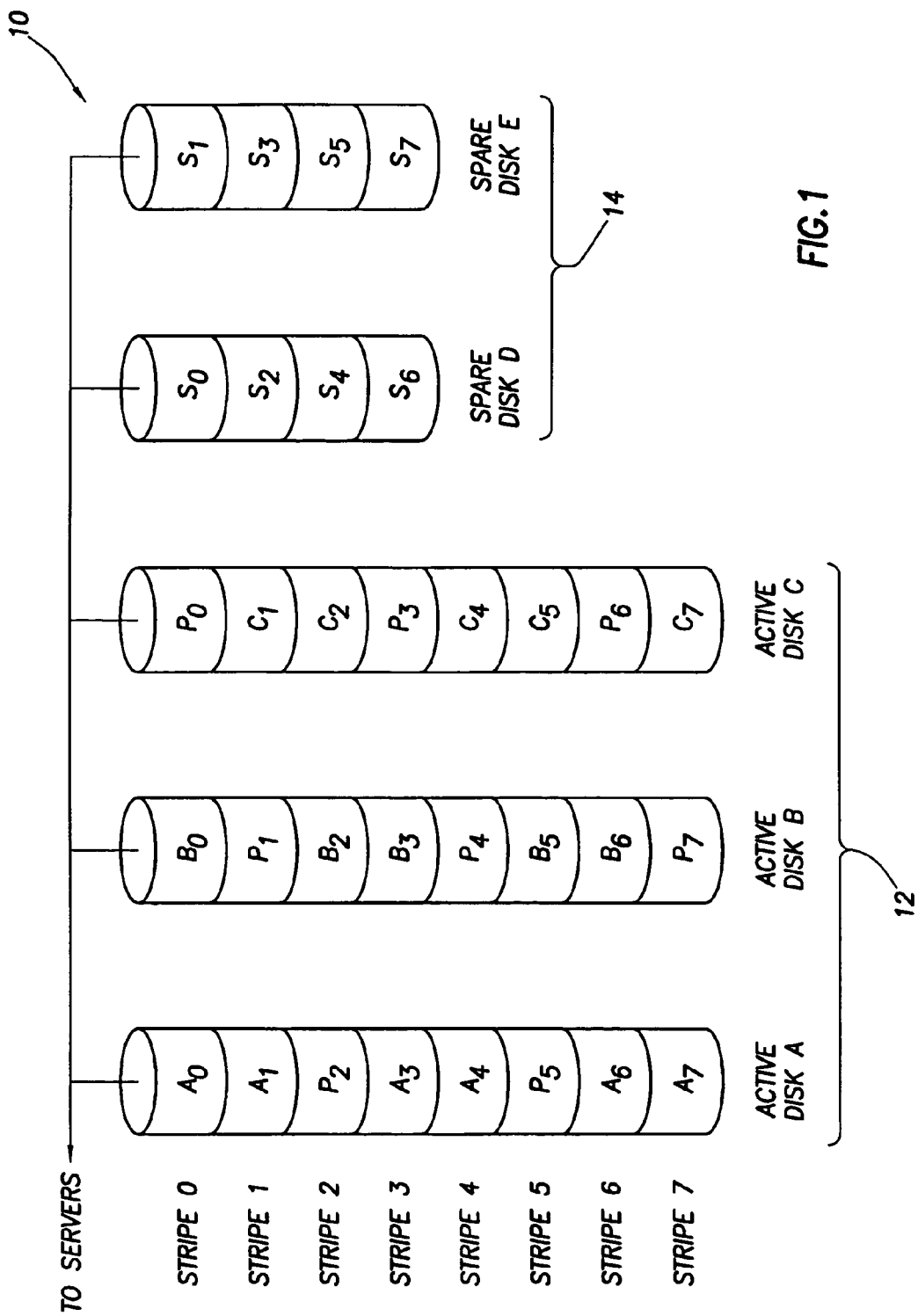
FIG. 1 is a diagram of a storage array.

FIG. 1 is a diagram of a storage array, which is indicated generally at 10 and that includes three active drives or disks, labeled Active Disk A through Active Disk C. The active disks, which comprise the active storage array, are identified at 12. Storage array 10 also includes a spare storage array, which is comprised of two spare disks, labeled Spare Disk D and Spare Disk E. The spare storage array is identified at 14. Each disk of the active storage array and the spare storage array are coupled to one or more servers (not shown) or other components of a computer network. The term active is used herein to identify a storage array as including accessible data content from a spare storage array that is in standby mode and does not include content that is meant to be accessible.

The disks of the active storage array 12 operate according to a RAID Level 5 data storage scheme. RAID Level 5 storage is characterized by the inclusion of a parity data block in each stripe of data as a method of protecting and providing for the ability to rebuild or restore the data of the stripe on the basis of the data stored in the remaining data blocks of the data stripe. Each of the three data disk in the example of FIG. 1 includes eight stripes or rows of data, labeled Stripe 0 through Stripe 7. It should be recognized that the configuration of the RAID array of FIG. 1 is an illustration and that an implementation of a RAID array may have more or few disks with more or fewer stripes or rows. The size or width of each stripe of data may be, for example, 64 KB per disk.

With reference to Stripe 0, data is stored in Active Disk A and Active Disk B. The parity bits for Stripe 0, which are the result of an exclusive-OR operation performed on the content of Stripe 0 in Disk A and Disk B, are stored in Disk C in data block $P_0$. As a second example of the data structure of storage array 10, with reference to Stripe 7, data is stored Disk A, and Disk C. The parity bits for Stripe 7, which are the result of an exclusive-OR operation performed on the content of Stripe 7 in Disk A and Disk C, are stored in Disk B in data block $P_7$. If, for example, Disk C were to fail or be replaced, the data of each stripe of Disk C would be rebuilt with the data in the other two disks of RAID array 12.

The disks of the spare storage array are arranged in a RAID Level 0 configuration. As indicated in FIG. 1, the data of a RAID Level 0 storage array is divided into blocks, and the data is written in stripes to the disks of the storage array. The size of each block on each disk of the spare storage array corresponds to the size of each block on each active disk of the active storage array 12. As such, the eight stripes of data on each active disk are equal in number to the eight data blocks distributed among the two disks of the spare storage array. The RAID Level 0 spare storage array includes only four strips of data, as compared to the eight stripes of data of the active storage array. RAID Level 0 arrays are characterized by improved write performance, as compared with other RAID storage configurations that include some additional measure of data redundancy in the data that is written to the storage drives.

Figure 2:
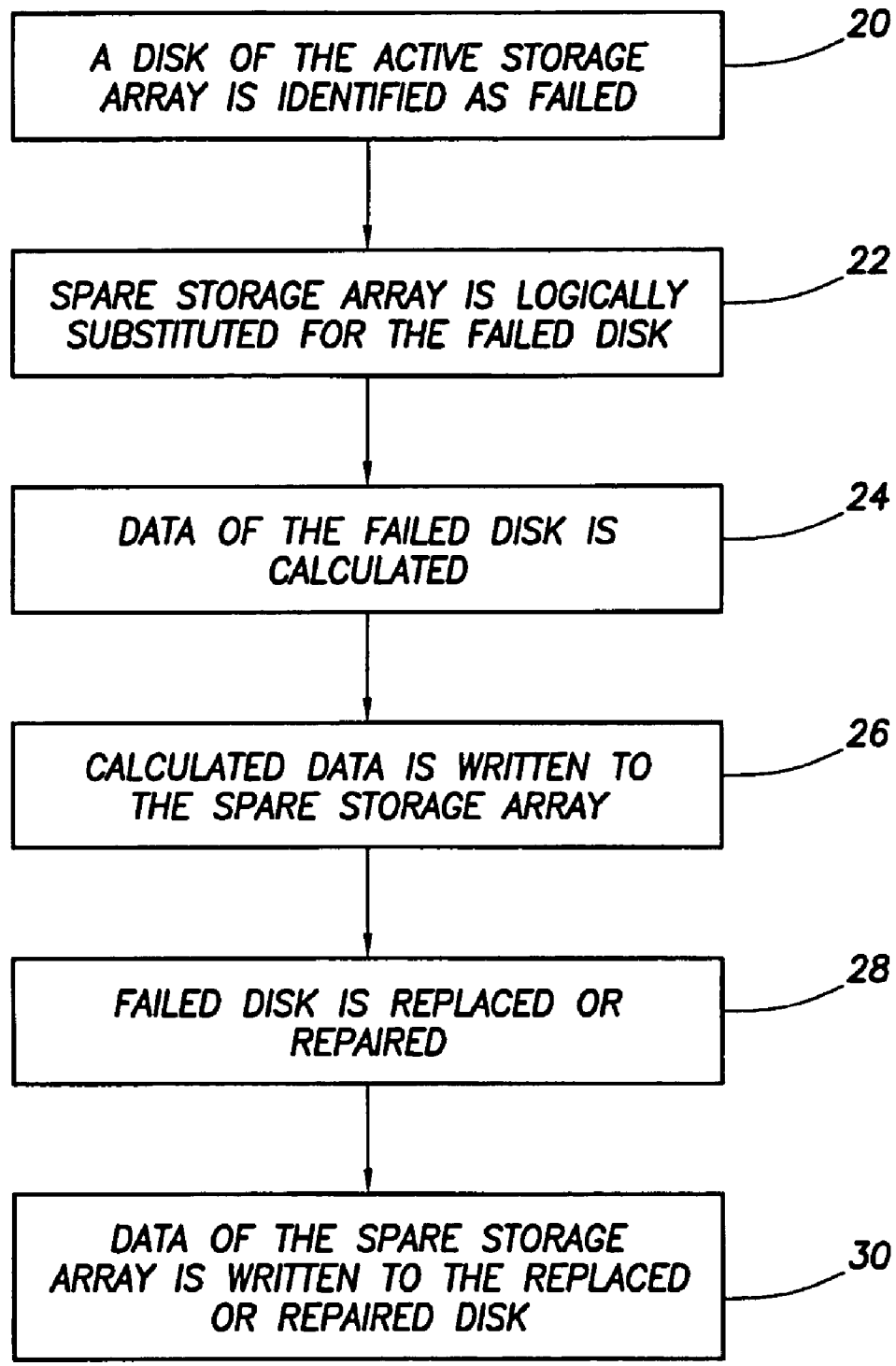
FIG. 2 is a flow diagram of a method for recovering from a failure in a drive of a storage array.

Shown in FIG. 2 is a flow diagram of a method for recovering from the failure of a drive of an active drive array. At step 20, a disk of the active storage array is identified as having failed. A disk may be identified as having failed for any of several reasons, including the mechanical failure of one of the individual hard drives in the volume or a temporary loss of power to the disk. The identification of the failed disk causes the volume to be degraded. At step 22, the spare storage array is logically substituted for the failed active drive. At step 24, the data of the failed disk is calculated on the basis of the content of the other disks of the storage array. In the example of FIG. 1, the data of each the eight data blocks in the failed disk is calculated by performing an exclusive-OR operation on the data blocks in the other two disks for each stripe of data. Following the data calculation step, the calculated data is written to the data blocks of the spare storage array. The calculated data is mapped at step 26 to the spare storage array such that data from a stripe is written serially to a corresponding data block in the spare storage array. As an example, calculated data for the data block in Stripe 4 is written to the data block $S_4$, which is in Stripe 3 of the RAID Level 0 spare storage array 14.

Figure 3:
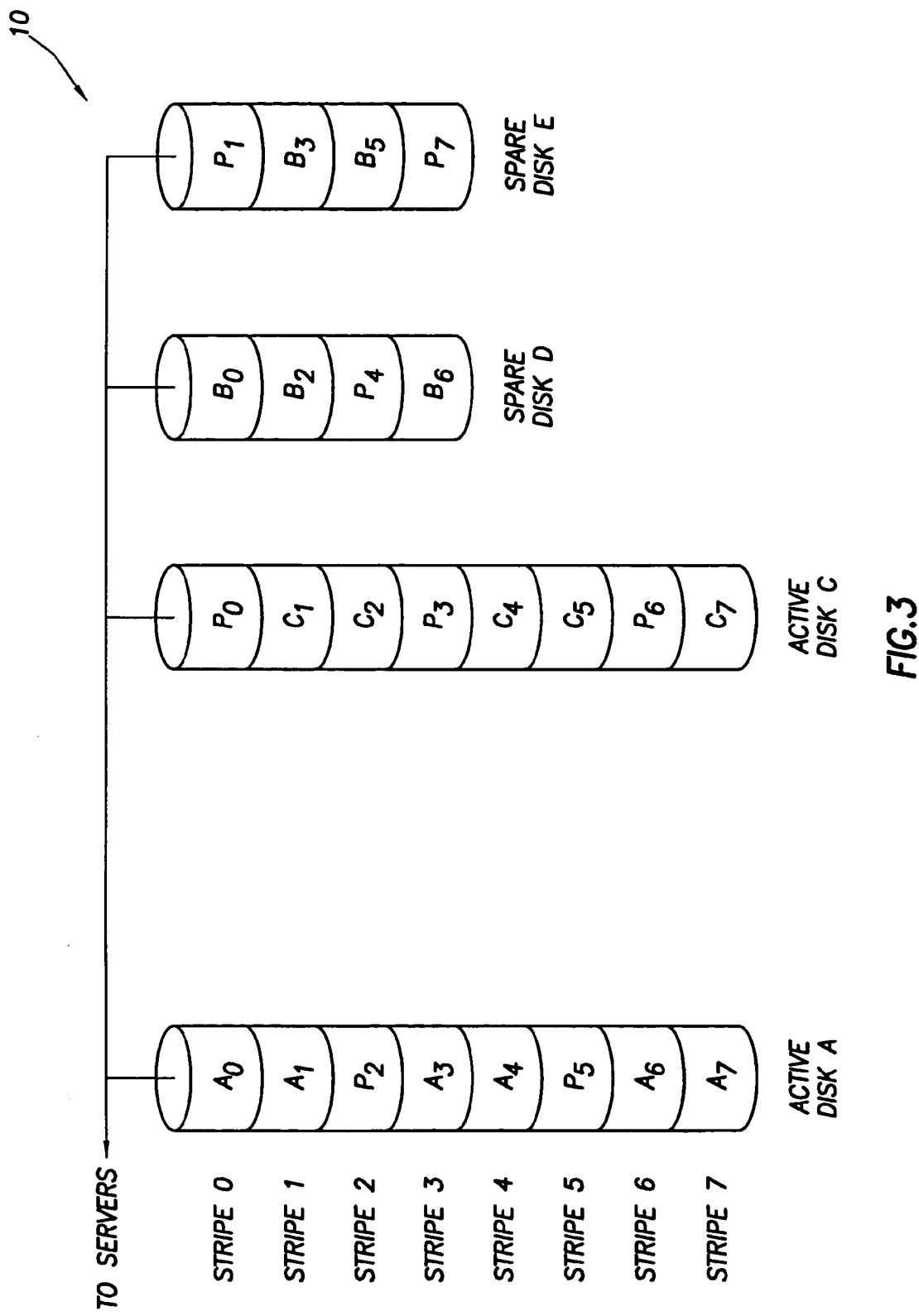
FIG. 3 is a diagram of a storage array following the replacement of a failed drive with a spare storage array.

A diagram of an example of storage array 10 following the calculation of the data of Disk B and the write of the calculated data to the disks of the spare storage array is shown in FIG. 3. As indicated in FIG. 3, each data block from disk B is mapped to a data block in one of the two disks of the spare storage array. At step 28 of FIG. 2, the failed disk is replaced or repaired, as necessary, and, at step 30, the data of the spare storage array is written back to the replaced disk of the active storage array. The data of the spare storage array is written to the replaced disk in the same mapping configuration as was used to write data to the spare storage array. As an example, data from data block $S_7$ of Spare Disk E is written to Stripe 7 of the replaced disk.

During step 30, a write command from a server may be directed at the replacement disk. The write command is executed on the replacement disk even though step 30 may be incomplete at the time that the command is executed. If a write command is executed with respect to the replacement disk before the completion of step 30, the replacement disk will include current data that should not be overwritten by data included on the spare storage array. In the event that such a write occurs to the replacement disk before the completion of step 30, the corresponding memory locations in the spare storage array are invalidated and are not copied back to the replacement disk during step 30. Identifying the invalidated memory locations in the spare storage array can be accomplished through a look-up table or a bitmap that identifies the range of invalidated memory locations. As an alternative to tracking invalidated memory locations, writes made to the replacement disk during step 30 are mirrored to the spare storage array. The mirrored data is written to the spare storage array at a memory location that corresponds to the location of the write made to the replacement disk.

The recovery method disclosed herein is particularly advantageous in that it provides for improved rebuild times and reduces the time during which the storage array is in a non-redundant state. Because of the superior write performance of a RAID Level 0 array, which comprises at least two disks, data can be written to such a storage array quickly, as compared to the more time-consuming process of writing the entire set of data to a single disk. Because the data of the failed drive can be quickly written to the multiple drives of the spare storage array, the active drive can be quickly returned to a redundant state efficiently and quickly, thereby reducing the risk that a second drive will fail during the period that the storage array is attempting to recover from the failure of a first drive.

The drive recovery method disclosed herein is not limited in its application to a storage array that includes a spare storage array that operates according to a RAID Level 0 storage methodology. The spare storage array could be configured according to another RAID level or distributed storage methodology, so long as selected the storage methodology improves the write performance of the rebuild step, as compared to the write performance associated with rebuilding and then writing all of the data to a single drive. The system and method disclosed herein is also not limited in its use to RAID storage methodologies or to a particular RAID storage level in the active or primary storage array. Rather, the technique disclosed herein may be employed with any data storage configuration in which a spare storage drive having an improved write performance is available for substitution for a failed drive of an active storage array. Although the present disclosure has been described in detail, it should be understood that various changes, substitutions, and alterations can be made hereto without departing from the spirit and the scope of the invention as defined by the appended claims.

What is claimed is:

1. A method for recovering from the failure of a drive in a first storage array having a redundant storage methodology, comprising the steps of:
   calculating the content of the failed drive; and
   writing the content of the failed drive to a second storage array, wherein the second array is configured to store data according to a Level 0 RAID storage methodology.

2. The method for recovering from the failure of a drive in a first storage array having a redundant storage methodology of claim 1, wherein the first storage array is configured to store data according to a RAID Level 5 storage methodology.

3. The method for recovering from the failure of a drive in a first storage array having a redundant storage methodology of claim 2, wherein the second storage array includes at least two drives and wherein the calculated data content of the failed drives is distributed across each of the drives of the second storage array.

4. The method for recovering from the failure of a drive in a first storage array having a redundant storage methodology of claim 3, wherein the second array includes a total number of data blocks among its drives that are equal to or greater in number than the data stripes present in the first storage array having a redundant storage methodology.

5. The method for recovering from the failure of a drive in a first storage array having a redundant storage methodology of claim 4, wherein each data block in the second array is equal in size to each data block of the first storage array.

6. The method for recovering from the failure of a drive in a first storage array having a redundant storage methodology of claim 5, wherein the step of writing the content of the failed drive to the second storage array comprises the step of writing the content of each data block of the failed drive to a corresponding data block on one of the drives of the second storage array.

7. The method for recovering from the failure of a drive in a first storage array having a redundant storage methodology of claim 6, further comprising the steps of:
   replacing the failed drive of the first storage array; and
   writing the content of the second storage array to the replaced drive in the first storage array.

8. The method for recovering from the failure of a drive in a first storage array having a redundant storage methodology of claim 7, wherein the step of writing the content of the second storage array to the replaced drive in the first storage array comprises the step of writing the content of each data block of the second storage array to a corresponding data block on the replaced disk of the first storage array.

9. The method for recovering from the failure of a drive in a first storage array having a redundant storage methodology of claim 8, further comprising the steps of:
   identifying write commands to the replaced drive in the first storage array that occur before the completion of the step of writing the content of the second storage array to the replaced drive; and
   invalidating in the second storage array memory locations that correspond to the modified memory locations in the replaced drive following the write command to the replaced drive, whereby data from the invalidated memory locations in the second storage array is not copied to the replaced drive.

10. The method for recovering from the failure of a drive in a first storage array having a redundant storage methodology of claim 8, further comprising the steps of:
    identifying write commands to the replaced drive in the first storage array that occur before the completion of the step of writing the content of the second storage array to the replaced drive; and
    writing the content of the write command to the replaced drive and to a memory location in the second storage array that corresponds to the location of the write command in the replaced drive.

11. A storage array, comprising:
    a first set of storage drives coupled together as a first storage array that is configured to store data according to a redundant storage methodology; and
    a second set of storage drives coupled together as a second storage array;
    wherein, upon the failure of a storage drive of the first set the data of the failed storage drive can be written to the multiple drives of the second set of storage drives; and
    wherein the process of writing of the data of the failed storage drive to the multiple drives of the second set of storage drives is operable to occur more quickly as compared to the writing of the data of the failed storage drive to a single storage drive.

12. The storage array of claim 11, wherein the first set of storage drives is configured to store data according to a RAID Level 5 storage methodology.

13. The storage array of claim 12, wherein the second set of storage drives is configured to store data according to a RAID Level 0 storage methodology.

14. The storage array of claim 13, wherein the second set of storage drives includes a total number of data blocks among its drives that are equal to or greater in number than the data stripes present in the first set of storage drives.

15. The storage array of claim 14, wherein the each data block in the second set of storage drives is equal in size to each data block of the first set of storage drives.

16. A method for recovering from a drive failure in a first storage array, comprising the steps of:
identifying the failed drive of the first storage array;
determining the contents of the failed drive;
writing the contents of the failed drive across the multiple drives of a second storage array.

17. The method for recovering from a drive failure in a first storage of claim 16, wherein the multiple drives of the second storage array operate according to a RAID Level 0 storage methodology.

18. The method for recovering from a drive failure in a first storage of claim 17, wherein the drives of the first storage array operate according to a RAID Level 5 storage methodology.

19. The method for recovering from a drive failure in a first storage of claim 18, wherein the second storage array includes a total number of data blocks among its drives that are equal to or greater in number than the data stripes present in the first storage array.

20. The method for recovering from a drive failure in a first storage of claim 19, wherein each data block in the second storage array is equal in size to each data block of the first storage array.

21. The method for recovering from a drive failure in a first storage of claim 20, wherein the step of writing the contents of the failed drive across the multiple drives of a second storage array comprises the step of writing the content of each data block of the failed drive to a corresponding data block on one of the drives of the second storage array.

22. The method for recovering from a drive failure in a first storage of claim 21, further comprising the steps of:
replacing the failed drive of the first storage array; and
writing the content of the drives of the second storage array to the replaced drive in the first storage array.

23. The method for recovering from a drive failure in a first storage of claim 22, wherein the step of writing the content of the drives of the second storage array to the replaced drive in the first storage array comprises the step of writing the content of each data block of the drives of the second storage array to a corresponding data block on the replaced disk of the first storage array.

24. The method for recovering from a drive failure in a first storage of claim 23, further comprising the steps of:
identifying write commands to the replaced drive in the first storage array that occur before the completion of the step of writing the content of the second storage array to the replaced drive; and
invalidating in the second storage array memory locations that correspond to the modified memory locations in the replaced drive following the write command to the replaced drive, whereby data from the invalidated memory locations in the second storage array is not copied to the replaced drive.

25. The method for recovering from a drive failure in a first storage of claim 23, further comprising the steps of:
identifying write commands to the replaced drive in the first storage array that occur before the completion of the step of writing the content of the second storage array to the replaced drive; and
writing the content of the write command to the replaced drive in the first storage array and to a memory location in the second storage array that corresponds to the location of the write command in the replaced drive in the first storage array.

* * * * *